United States Patent Office 3,348,848
Patented Oct. 24, 1967

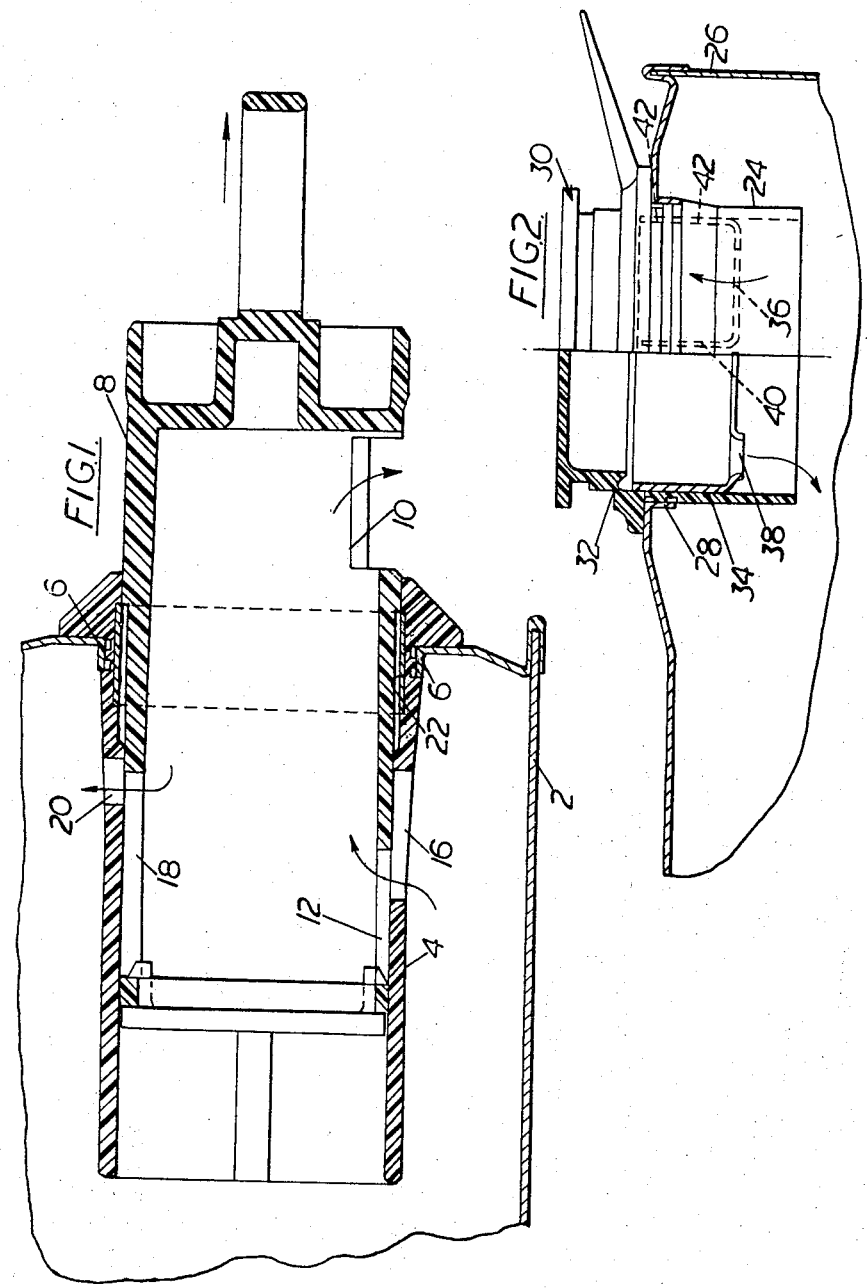

3,348,848
TUBULAR BODY MOUNTING AND SEALING ELEMENT OF A SEPTUM INSERT FOR CONTAINERS
Anthony James Lucking, London, and Charles Anthony Lane, Surrey, England, assignors to Waddington & Duval (Holdings) Limited, London, England
Filed Mar. 28, 1966, Ser. No. 537,732
Claims priority, application Great Britain, Apr. 1, 1965, 13,915/65
2 Claims. (Cl. 277—26)

This invention relates to a tubular body sealing and mounting element for taps, pourers, dispensers and the like adapted to be fitted to containers to enable the contents thereof to be dispensed.

Such taps and the like are normally fitted through an aperture in the wall of the container and a difficulty arises in obtaining a reliable leak-proof seal especially if the tap is made for example of an artificial plastic material and the container of metal and when the container is subjected to temperature changes.

It will be appreciated that in some parts of the world the ambient temperature may range from say —20° C. in winter to a summer temperature of 55° C in the sun. When the plastic tap, pourer or the like is fitted into the aperture in the container the liquid seal is created because of the mechanical interference fit between the tap and the container. However, this creates a stress in the plastic material and at high ambient temperatures the plastic material tends to "creep" so that when the temperature drops to normal the interference fit can very well be destroyed. If the container is thereafter subjected to very low temperatures there may even be a small gap between the tap and the container since the coefficient of thermal expansion of common thermoplastic materials such as polyethylene and polypropylene are considerably greater than those of tin plate or mild steel.

A dispenser, tap, pourer or the like made of plastic material in accordance with the invention has a tubular body designed to be connected through a dispensing hole or aperture in the wall of a container and is provided with a ring, of a material whose coefficient of expansion approximates that of the material of the container, located within the tubular body adjacent that portion thereof which is designed to engage the wall of the container. For example if the container is made of metal the ring is conveniently made of the same metal which is preferably fairly resilient such as tin plate or steel.

In use the ring presses outwardly against the inside of the plastic body to maintain the interference fit between the plastic body and the sides of the aperture in the container and this continues regardless of any creep of the plastic material. As the material of the ring is chosen to have a coefficient of thermal expansion similar to that of the container and as the plastic material of the body is trapped between the two, a leak-proof seal is maintained at all ambient temperatures to be encountered.

The ring can be set into a groove in the body part of the tap or pourer so as not to interfere with the working of the tap or it can be provided by a skirt or the like of a septum insert provided within the body to separate the liquid being dispensed from the air returning to the interior of the container.

The invention will now be further described by way of example with reference to the accompanying drawing in which:

FIGURE 1 is a cross section through one embodiment of a tap fitted to a container, and FIGURE 2 is a cross section through an alternative embodiment of tap or pourer.

The tap shown in FIGURE 1 is designed for use with containers having a fluid capacity of, for example, four gallons or more, the container 2 being designed to lie on its side so that the tap which is fitted through an aperture in one of the end walls thereof is located horizontally.

The tap comprises a tubular body portion 4 which is fitted through the aperture in the container end wall and is provided with a plastic seal arrangement generally indicated at 6 such as that described in the specifications of our co-pending U.S. application Ser. No. 294,675, filed July 12, 1963, and a tubular inner portion 8 which is a sliding fit within the body 4 and is provided with an outlet hole 10 at one end thereof and an inlet hole 12 adjacent the other end thereof. In use the inner portion 8 is reciprocated by means of a handle between the dispensing position as shown in the drawing in which liquid from the container passes into the interior of the sliding part 8 through a hole 16 in the body wall and through the hole 12 in the sliding part and out from the dispensing hole 10, air returning to the interior of the container through the hole 10 and holes 18 and 20 in the sliding part and the body part respectively.

When it is desired to close the tap the sliding part is pushed into the body part so that the hole 12 becomes mis-aligned with the hole 16 and the hole 18 mis-aligned with the hole 20. The tap in general form is described in the specification of our U.S. co-pending patent application Ser. No. 297,493, now U.S. Letters Patent No. 3,207,388.

The interior of the body portion 4 is provided with a groove and its inner surface opposite to the seal 6 and a metal ring 22 is secured within the groove, the metal of the ring being chosen so as to have a coefficient of thermal expansion approximating to that of the material of the container 2. As will be seen, the ring helps to press the wall of the plastic body portion 4 against the side of the aperture in the container wall and this effect is maintained despite temperature changes.

The pourer shown in FIGURE 2 is made in accordance with the teachings of the specification of our U.S. copending patent application Ser. No. 448,081, the tubular body portion 24 being of a thermoplastic material and secured within the dispensing opening of a small metal container generally indicated at 26. The wall of the pourer is provided with a sealing arrangement 28 similar to seal 6 of the tap shown in FIGURE 1 and is normally closed by means of a cap 30 which is secured to the body by means of a small membrane 32 during transit, which membrane is adapted to be sheared by a user prior to the pourer being used to dispense liquid from the container.

The interior of the pourer is provided with a septum member 34 of the same metal as the container and arranged to extend across the interior of the body. The septum member is formed with a hole 36 for liquid and a small hole 38 for the passage of air returning into the contaner as liquid is dispensed therefrom. It is provided with an upstanding partition wall 40 to help to separate the liquid stream from the air stream and also with a circumferential skirt 42 which is a tight fit against the inner surface of the tubular wall of the body. This skirt provides a ring which is located opposite to the sealing portion 28 and which acts to provide an effective seal between the body and the container aperture despite temperature changes.

The metal rings 22 (FIGURE 1) and 42 (FIGURE 2) are made sufficiently thin to allow of inward deformation corresponding to inward movement of the ribs of the sealing devices 6 and 28. However, the outward radial thrust provided by the ring is much higher than that due only to the resilience of the plastic material so a superior seal is achieved particularly after a substantial period of use has elapsed or at elevated temperatures.

A tap in accordance with the invention is particularly though not exclusively useful for anti-freeze containers.

We claim:

1. In a dispenser, tap, pourer or the like made of plastic material a tubular body adapted to be fitted through an aperture in the wall of a container whose contents are to be dispensed; seals on the body adapted to engage the walls of the aperture, and a ring of a material whose coefficient of expansion approximates that of the material of the container tightly disposed entirely within an annular recess in the tubular body adjacent to and at the opposite side of the wall from the seal.

2. In a tubular body as claimed in claim 1, the ring being formed of metal.

References Cited

UNITED STATES PATENTS

| 1,393,331 | 10/1921 | Wilson | 222—525 |
| 1,912,304 | 5/1933 | Phillips | 222—523 X |
| 2,270,060 | 1/1942 | Kotlarz | 285—187 X |
| 2,649,315 | 8/1953 | Ipsen. | |
| 2,778,545 | 1/1957 | Sapia | 222—482 |
| 2,992,761 | 7/1961 | Sommers | 222—525 X |
| 3,136,557 | 6/1964 | Tauscher | 277—26 |
| 3,207,388 | 9/1965 | Waddington et al. | |
| 3,233,907 | 2/1966 | Stanton. | |

ROBERT B. REEVES, *Primary Examiner.*

N. L. STACK, *Assistant Examiner.*